April 25, 1933.    I. L. DUNN    1,905,822
PACKING
Filed Oct. 6, 1930
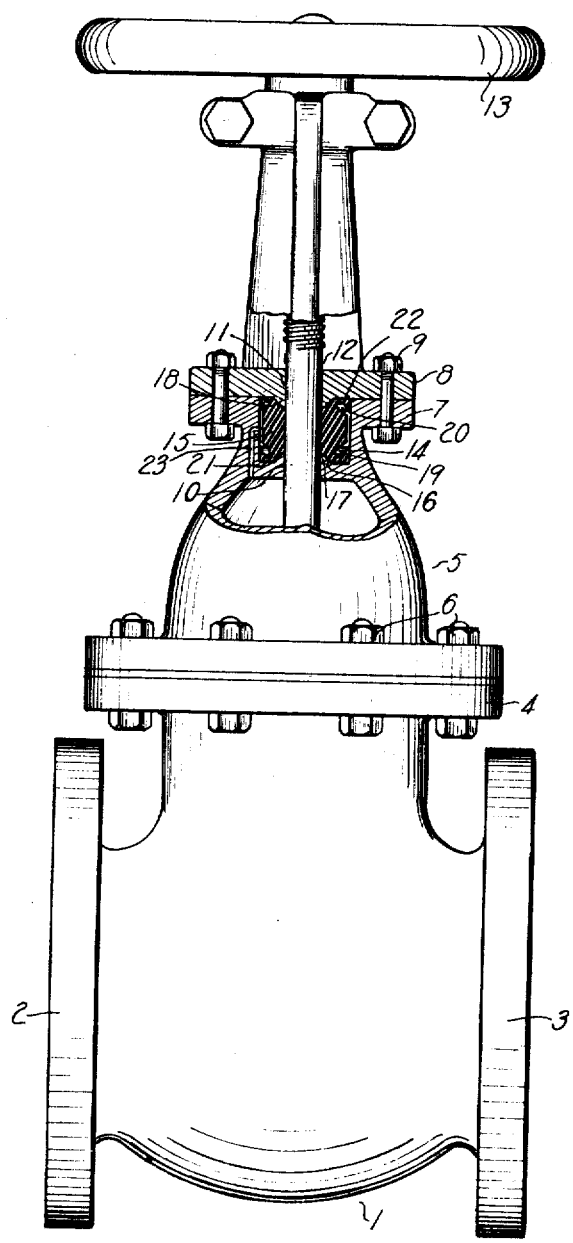
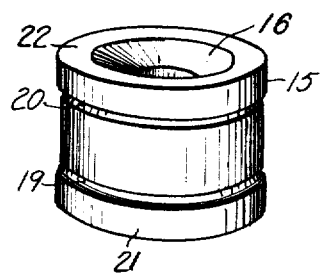
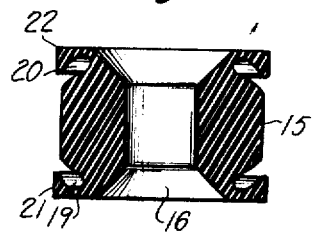
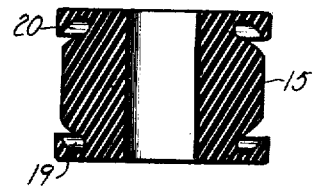
INVENTOR
*Irwin L. Dunn*
BY *Arthur C. Brown*
ATTORNEY Patented Apr. 25, 1933

1,905,822

UNITED STATES PATENT OFFICE

IRWIN L. DUNN, OF TULSA, OKLAHOMA

PACKING

Application filed October 6, 1930. Serial No. 486,710.

My invention relates to packing and more particularly to resilient packing adapted to be urged into sealing relation with moving members by fluid pressure, the principal object of my invention being to provide a packing ring wherein the outer surface area is greater than the area of the inner surface so that the effect of fluid pressure on the outer surface of the ring will be multiplied for more firmly urging the inner surface of the ring against the moving member.

Another object of my invention is to provide a ring that is urged laterally against a moving member, such as a shaft, so that the wear of the ring is taken up more uniformly by fluid pressure than is possible with similar rings compressed in parallel relation with the shaft.

In accomplishing these and other objects of my invention I have provided improved details of structure the preferred forms of which are illustrated in the accompanying drawing, wherein:

Fig. 1 is an elevational view of a valve with a portion of the cap plate and bonnet removed to disclose a packing ring embodying my invention and shown in central section.

Fig. 2 is an enlarged perspective view of the sealing ring.

Fig. 3 is an enlarged view of the ring in central cross section.

Fig. 4 is a modified form of the ring constructed without the conical recesses.

Referring more in detail to the drawing: 1 designates a valve body having the usual end flanges 2 and 3, and a side flange 4 to which a bonnet 5 is secured by bolts 6. The outer portion of the bonnet terminates in a flanged end 7 for seating a cap plate 8 attached thereto by bolts 9 extended through aligning openings in the flange and plate.

Extending through aligning openings 10 and 11 in the bonnet and cap plate respectively is a valve stem 12 provided with a hand wheel 13 on its upper end for opening and closing the valve.

The opening 10 is counter-bored to form a socket 14 for seating a packing ring 15, preferably formed of soft rubber and surrounding the valve stem.

In order to produce a ring having an inner surface of less width than the outer surface a conical recess 16 is formed in each end thereof and complementary bosses 17 and 18 are provided in the bottom of the socket and on the lower face of the cap plate respectively for engaging said recesses.

The sealing ring is further formed with a pair of spaced circumferential grooves 19 and 20, preferably diverging toward the ends of the ring, thereby providing annular end lips 21 and 22.

The outer surface of the ring between said grooves is of less diameter than the remainder of the ring so that fluid entering through a port 23 provided in the bonnet for communicating the interior of the valve with the socket, is directed over the entire reduced portion of the ring.

A packing ring constructed as described may be inserted in the socket of the valve bonnet with either end directed downwardly since one end is a duplicate of the other and the grooves are spaced equally from the ends of the ring.

The decreased width of the inner surface of the ring in proportion to the outer circumferential surface, due to the conical recesses, causes an increase of pressure to be exerted against the valve stem over the fluid pressure in the valve body thus insuring more positive sealing of the valve stem.

By providing a plurality of circumferential grooves in the ring the fluid pressure is more evenly distributed over the outer surface of the ring and the end portions are more flexible for sealing the ends of the sockets.

In the modified form illustrated in Fig. 4 the conical recesses have been omitted and the increased diameter of the outer surface relative to that of the inner surface is depended on for multiplying the effect of fluid pressure exerted against the outer surface of the ring to urge the inner surface firmly against the valve stem.

It will thus be seen that the pressure exerted by leakage around the stem pressing outwardly against the ring will be overcome by the greater pressure exerted against the exterior of the ring by reason of its greater diameter, or greater width, or a combination of the two, and by proportioning these dimensions the differential pressure can be regulated to suit the particular use.

Attention is further directed to the fact that the pressure exerted against the packing will be automatically proportional to the fluid pressure in the valve body, as for example, when the pressure in the valve is low the packing will be urged with a correspondingly low pressure against the stem thus preventing excessive wear of the packing.

A satisfactory result may also be obtained, without the use of a port, by providing a slight space between the lower end of the packing ring and the base of the socket. Fluid pressure will then raise the lower flexible lip and be trapped between the outer wall of the ring and the socket wall. It will be apparent however, that with this structure the pressure against the packing will not be accurately proportioned to the pressure in the valve.

While the sealing ring has been illustrated and described as applied to a valve it will be obvious that there are numerous other devices to which a ring such as described may be equally well adapted.

What I claim and desire to secure by Letters Patent is:

A packing ring having a central portion of its circumference reduced in diameter to provide relatively narrow contacting rings at the end of the body, the body member being recessed to provided inclined undercut grooves at the ends of said reduced central portion forming relatively narrow necks for said end ring members, whereby said members may be flexed in response to pressure of fluid admitted to said grooves.

In testimony whereof I affix my signature.

IRWIN L. DUNN.